(12) United States Patent
Moore

(10) Patent No.: US 10,103,567 B2
(45) Date of Patent: Oct. 16, 2018

(54) PHOTOVOLTAIC CELL ACCESSORY FOR A BATTERY POWERED DEVICE

(71) Applicant: GOJO Industries, Inc., Akron, OH (US)

(72) Inventor: Mark Moore, Aurora, OH (US)

(73) Assignee: GOJO INDUSTRIES, INC., Akron, OH (US)

( * ) Notice: Subject to any disclaimer, the term of this patent is extended or adjusted under 35 U.S.C. 154(b) by 0 days.

(21) Appl. No.: 15/365,057

(22) Filed: Nov. 30, 2016

(65) Prior Publication Data

US 2017/0163083 A1      Jun. 8, 2017

Related U.S. Application Data

(60) Provisional application No. 62/263,221, filed on Dec. 4, 2015.

(51) Int. Cl.
*H02J 7/35* (2006.01)
*H02J 9/00* (2006.01)
*H02P 4/00* (2006.01)

(52) U.S. Cl.
CPC ...... *H02J 7/35* (2013.01); *H02J 9/00* (2013.01); *H02P 4/00* (2013.01)

(58) Field of Classification Search
CPC .................................... H02J 7/35; H02J 9/00
See application file for complete search history.

(56) References Cited

U.S. PATENT DOCUMENTS

| | | | | |
|---|---|---|---|---|
| 5,173,653 A | * | 12/1992 | Hochstein | ............ H02J 7/0031 307/141 |
| 6,209,752 B1 | * | 4/2001 | Mitchell | ............ A47K 5/1215 222/181.3 |
| 8,590,751 B2 | | 11/2013 | Ciavarella et al. | |
| 2008/0018302 A1 | * | 1/2008 | Reinsel | ................. A47K 10/36 320/124 |
| 2010/0168926 A1 | * | 7/2010 | Bayley | ..................... E03C 1/02 700/282 |

* cited by examiner

*Primary Examiner* — Muhammad S Islam
(74) *Attorney, Agent, or Firm* — Calfee, Halter & Griswold LLP

(57) ABSTRACT

A power management system includes a battery circuit element connected in parallel with a load and including a non-rechargeable battery and a first diode connected in series with the non-rechargeable battery, a capacitor circuit element connected in parallel with the battery circuit element and including a capacitor connected in series with a second diode, and a photovoltaic cell circuit element connected in parallel with the capacitor circuit element and including a photovoltaic cell connected in series with a third diode. The first and second diodes are configured such that when a voltage of the non-rechargeable battery exceeds a voltage of the capacitor, the non-rechargeable battery supplies current to the load to power the load, and when the voltage of the capacitor exceeds the voltage of the non-rechargeable battery, the capacitor supplies current to the load to power the load.

9 Claims, 3 Drawing Sheets

PHOTOVOLTAIC CELL ACCESSORY FOR A BATTERY POWERED DEVICE

CROSS-REFERENCE TO RELATED APPLICATION

This application claims priority to and the benefits of U.S. Provisional Patent Application Ser. No. 62/263,221 filed on Dec. 4, 2015 and entitled "PHOTOVOLTAIC CELL ACCESSORY FOR A BATTERY POWERED DEVICE," which is incorporated herein by reference in its entirety.

BACKGROUND

Dispensers are commonly used in restaurants, factories, hospitals, and public bathrooms. These dispensers may contain fluids such as soap, anti-bacterial cleansers, disinfectants, lotions and the like, or other materials, such as powder or aerosol materials, or pre-packaged materials. Some dispensers utilize some type of manual pump actuation mechanism wherein the user pushes or pulls a lever to manually dispense a quantity of fluid into the user's hands. "Hands-free" dispensers may also be utilized wherein the user simply places their hand underneath or in front of a sensor and an electromechanical pump mechanism dispenses a metered quantity of fluid. One example of a sensor arrangement for a hands free dispenser includes an infrared light emitting diode and a light detecting photo diode that senses changes in the reflected light resulting from positioning of a user's hand under the dispenser spout.

A typical hands free dispenser requires an electrical power source, both to continually power the sensor arrangement and to power the pump mechanism in response to activation of the sensor arrangement. Internal dispenser batteries and external (AC) outlet connections are commonly used.

SUMMARY

The present application contemplates inventive systems and devices for providing an alternative power source (e.g. a photovoltaic cell) for a battery powered device (e.g., a fluid dispenser).

In an exemplary embodiment of the present application, a power management system for supplying electric power to a load includes a battery circuit element, a capacitor circuit element, and a photovoltaic cell circuit element. The battery circuit element is connected in parallel with the load, with a first portion of the battery circuit element including a non-rechargeable battery and a second portion of the battery circuit element including a first diode connected in series with the non-rechargeable battery to prevent current backflow into the non-rechargeable battery. The capacitor circuit element is connected in parallel with the battery circuit element, and includes a capacitor connected in series with a second diode that prevents current flow from the non-rechargeable battery to the capacitor. The photovoltaic cell circuit element is connected in parallel with the capacitor circuit element to charge the capacitor, and includes a photovoltaic cell connected in series with a third diode that prevents current flow from the capacitor to the photovoltaic cell. The first and second diodes are configured such that when a voltage of the non-rechargeable battery exceeds a voltage of the capacitor, the non-rechargeable battery supplies current to the load to power the load, and when the voltage of the capacitor exceeds the voltage of the non-rechargeable battery, the capacitor supplies current to the load to power the load.

In another exemplary embodiment of the present application, a battery powered dispenser is provided in combination with an attachable photovoltaic cell module. The battery powered dispenser includes a housing, a reservoir carried by the housing for storing a fluid, a dispensing mechanism operable to dispense fluid from the reservoir, and a battery circuit element connected with the dispensing mechanism and partially defined by a first electrical connector, the battery circuit element including a non-rechargeable battery. The photovoltaic cell accessory includes a mounting structure for attaching the photovoltaic cell accessory to the housing of the dispenser, and a photovoltaic cell module secured to the mounting structure. The photovoltaic cell module includes a first module circuit element at least partially defined by a second electrical connector, a second module circuit element connected with the first module circuit element and including a capacitor, and a third module circuit element connected in parallel with the second module circuit element and including a photovoltaic cell that charges the capacitor. The first electrical connector of the battery powered dispenser includes a switch contact configured to close the battery circuit element when the second electrical connector is disconnected from the first electrical connector to supply current from the non-rechargeable battery to the dispensing mechanism. When the second electrical connector is connected with the first electrical connector, the second electrical connector opens the battery circuit element and forms a closed circuit including the battery circuit element and the first module circuit element to connect the capacitor with the dispensing mechanism.

In another exemplary embodiment of the present application, a battery powered dispenser is adapted to be optionally powered by an external power source. The dispenser includes a housing, a pump disposed within the housing, a reservoir carried by the housing for storing a fluid, a motor disposed within the housing and operable to actuate the pump to dispense fluid from the reservoir, and a battery circuit element connected with the motor and partially defined by the first electrical connector. The battery circuit element includes a non-rechargeable battery. The first electrical connector includes a switch contact configured to close the battery circuit element when no external electrical connector is connected with the first electrical connector to supply current from the non-rechargeable battery to the motor.

In another exemplary embodiment of the present application, a photovoltaic cell module includes a module body, an electrical connector carried by the module body, and first, second, and third module circuit elements. The first module circuit element is at least partially defined by the electrical connector and includes a first diode. The second module circuit element is connected with the first module circuit element and includes a capacitor and a second diode connected in series with the capacitor to prevent current flow through the electrical connector to the capacitor when the electrical connector is connected with a battery power source of a battery powered device. The third module circuit element is connected in parallel with the second module circuit element and includes a photovoltaic cell that charges the capacitor and a third diode connected in series with the photovoltaic cell to prevent current flow from the capacitor to the photovoltaic cell.

In another exemplary embodiment of the present application, a battery powered dispenser is provided in combination with an attachable photovoltaic cell accessory. The battery powered dispenser includes a housing having a wall mountable rear wall extending between forward extending top, bottom, and left and right side walls to define an outer perimeter, a reservoir carried by the housing for storing a fluid, a dispensing mechanism disposed in the housing and operable to actuate the pump to dispense fluid from the reservoir, and a battery disposed in the housing and electrically connected with the dispensing mechanism to power the dispensing mechanism. The photovoltaic cell accessory includes a mounting plate and a photovoltaic cell module. The mounting plate includes an upper portion and left and right side portions defining an opening therebetween. The opening is sized to correspond with the outer parameter of the dispenser housing. First and second flange portions recessed from a front surface of the left and right side portions of the mounting plate extend laterally inward from the left and right side portions of the mounting plate to be secured between the rear wall of the dispenser housing and an external wall when the dispenser housing is mounted to the external wall. The photovoltaic cell module is secured to a front surface of the upper portion of the mounting plate, and includes a photovoltaic cell electrically connected with a capacitor to charge the capacitor. The capacitor is electrically connected with a second electrical connector, such that the capacitor powers the dispensing mechanism when the second electrical connector is connected with a first electrical connector of the dispenser and a voltage of the capacitor exceeds a voltage of the battery.

BRIEF DESCRIPTION OF THE DRAWINGS

These and other features and advantages of the present invention will become better understood with regard to the following description and accompanying drawings in which.

DETAILED DESCRIPTION

Figure 1:
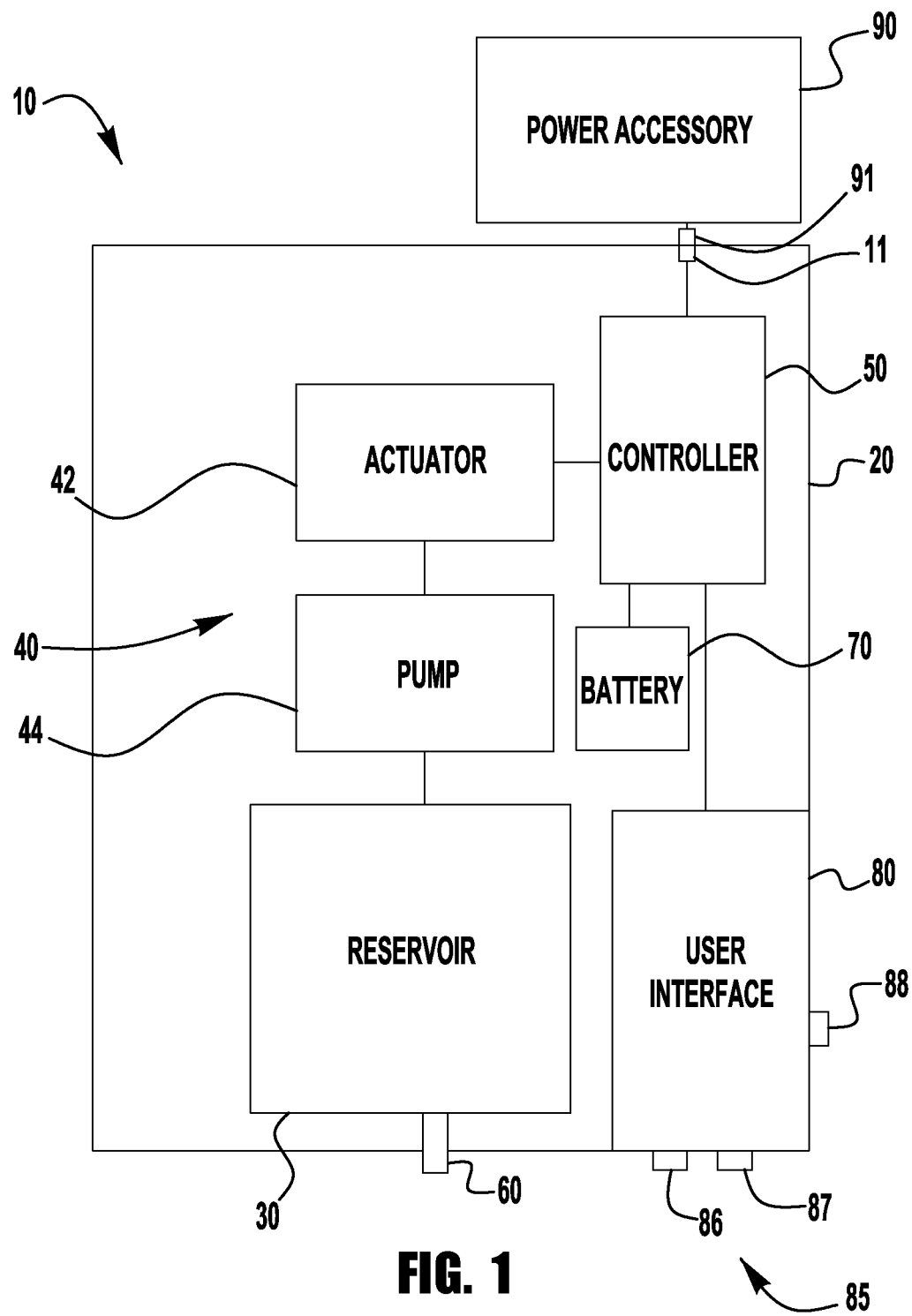
FIG. 1 is a schematic view of a hands free fluid dispenser, according to an exemplary embodiment.

The Detailed Description merely describes exemplary embodiments of the invention and is not intended to limit the scope of the claims in any way. Indeed, the invention is broader than and unlimited by the exemplary embodiments, and the terms used in the claims have their full ordinary meaning.

Also, while certain exemplary embodiments described in the specification and illustrated in the drawings relate to battery powered, "hands free," hand hygiene fluid dispensers with attachable photovoltaic cell accessories for providing alternative power, it should be understood that many of the inventive features described herein may be applied to other devices, systems, and methods. For example, the features described herein may be utilized in other types of dispensers, other battery powered devices, and other alternative power arrangements (e.g., piezoelectric power, thermal power).

"Circuit communication" indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

"Logic," as used herein, is synonymous with "circuit" or "circuitry" and includes, but is not limited to, hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

"Signal," includes, but is not limited to one or more electrical signals, analog or digital signals, one or more computer instructions, a bit or bit stream, or the like.

Any values identified in the detailed description are exemplary and they are determined as needed for a particular dispenser and/or refill design. Accordingly, the inventive concepts disclosed and claimed herein are not limited to the particular values or ranges of values used to describe the embodiments disclosed herein.

An exemplary aspect of the present application involves systems and devices for providing an alternative power source to a battery powered device, such as, for example, a "hands free" fluid (e.g., soap or sanitizer fluid) dispenser. In one such embodiment, a photovoltaic cell accessory is electrically and physically attachable to a fluid dispenser to supply alternative power to a pump mechanism and sensor arrangement of the dispenser, for example, when available light radiation is sufficient to generate a charge that exceeds a charge of the stored battery.

FIG. 1 schematically illustrates a hands free fluid dispenser 10 with an alternative power accessory 90 physically and electrically connected with the fluid dispenser. The fluid dispenser 10 includes a fluid storing reservoir 30 and a dispensing mechanism 40 (e.g., an actuator/motor 42 and pump 44) disposed in a housing 20, and a spout or nozzle portion 60 carried by the housing and connected to the reservoir 30. The housing 20 may include a panel, door, or shell portion (not shown) that is removable to facilitate replacement or refilling of the reservoir 30.

The dispensing mechanism 40 is operable to pump or otherwise facilitate the flow of fluid from the reservoir 30 through the nozzle 60 in response to user manipulation of a user interface (shown schematically at 80). The user interface may include any suitable manual, electromechanical, or electronic actuating mechanism, including, for example, a manually depressible hand bar or plunger, an electrical switch engaging button, or a "hands free" voice, optic, motion, or proximity sensor. In the schematically illustrated example, the dispenser 20 includes a controller 50 in circuit communication with an electronic user interface 80 (e.g., button or "hands free" sensor), an electrically powered dispensing mechanism 40 (e.g., a motor operated pump), and a battery 70. When the controller 50 receives an actuation signal from the user interface 80, the controller initiates battery powered operation of the dispensing mechanism 40 to dispense fluid from the reservoir 30 through the nozzle 60.

The hands free sensor-based user interface 80 is disposed on an outer surface of the dispenser housing 20 (e.g., on a bottom wall of the housing). The exemplary user interface 80 includes a touch free sensor arrangement 85, with an infrared light emitting diode 86 and a light detecting photo diode 87 that senses changes in the reflected light resulting from positioning of a user's hand under the spout. The controller 50 receives signals from the photo diode 87 to initiate operation of the dispensing mechanism 40. The dispensing mechanism may be activated within a brief predetermined time period (e.g., about 200 ms) after the user's hand passes within a detection range (or activation zone) of the sensor arrangement 85, to dispense a predetermined dose of fluid in the user's hand. To prevent excess dispensing of fluid, the user interface microcontroller may be configured to require an empty activation zone for a predetermined time period (e.g., about 0.12 seconds) before transmitting a new actuation signal in response to a subsequent detection of a user's hand in the activation zone. The user interface may further include a maintenance indicator light 88 to provide an indication of a dispenser condition requiring attention (e.g., low battery condition, low fluid condition, blocked flow condition).

To extend the life of the internal battery 70, the alternative power source 90 is connected with the controller 50, user interface 80, and dispensing mechanism 40 to power at least one of these dispenser components when the alternative power accessory 90 has stored sufficient energy to provide an adequate voltage. While this alternative power source may be integral to the dispenser, in the illustrated example, the alternative power accessory 90 is detachable from the dispenser, for example, for selective use with dispensers placed into service settings in which extended service conditions are necessary or desired, or service settings in which the alternative power accessory is better situated to collect or harvest energy (e.g., a photovoltaic cell is a well lit environment). In the illustrated schematic, the accessory 90 includes an electrical connector 91 to connect with a mating electrical connector 11 of the dispenser (e.g., disposed on a top wall of the dispenser).

The dispenser 10, together with the alternative power accessory 90, may form a power management circuit arrangement by which a power source (e.g., capacitor) of the alternative power accessory 90 powers at least one of the dispensing mechanism 40, the controller 50, and the user interface 80 when the power source exceeds a predetermined voltage (e.g., a voltage greater than the battery voltage). When the power source voltage is below the predetermined voltage, the battery 70 supplies power to the at least one of the dispensing mechanism 40, the controller 50, and the user interface 80. In other exemplary arrangements, the power accessory may be configured to only power the controller and user interface (having lower current, but more frequent, power requirements), with the internal battery powering the dispensing mechanism (having greater current, but less frequent power requirements), and, when the power accessory supply voltage is insufficient, also powering the controller and user interface.

While many different types of alternative power accessories may be utilized, in an exemplary embodiment, a photovoltaic cell accessory is attachable to the dispenser to provide an alternative power source, taking advantage of a lighted environment in which the dispenser is disposed (e.g., direct sunlight, ambient light, interior lighting) to power at least a portion of the electrically powered components of the dispenser for at least a portion of a period of operation.

Figure 2:
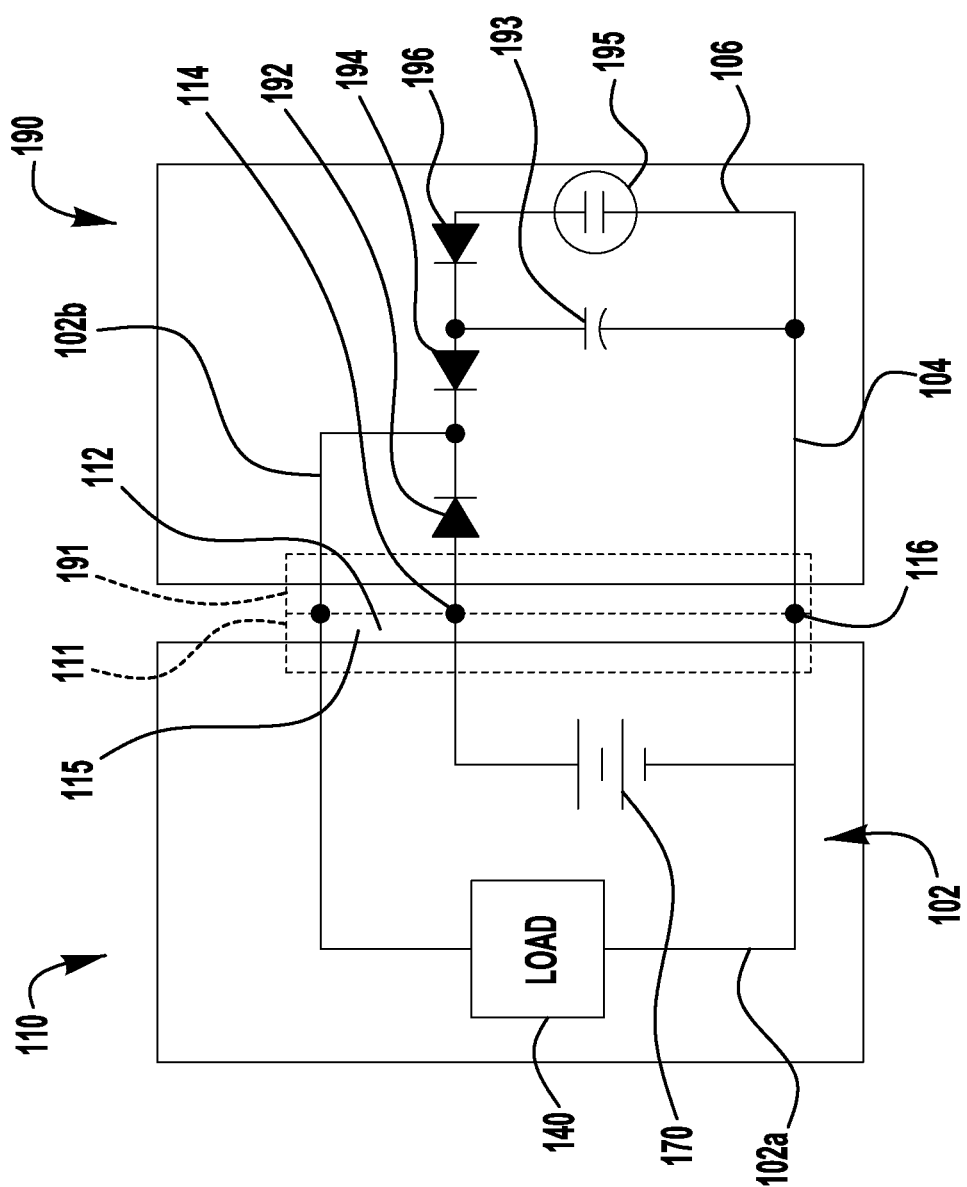
FIG. 2 is a schematic diagram of a battery powered device assembled with an alternative power source accessory, according to an exemplary embodiment.

FIG. 2 schematically illustrates a battery powered device 110 having an external first electrical connector 111 connected with a second electrical connector 191 of a photovoltaic cell accessory 190, with the device and the accessory together defining a power management system 100. The power management system 100 includes a first, battery circuit element 102 having a first portion 102a disposed in the device 110 and including a battery 170 in circuit communication with a power consuming load 140 (e.g., dispensing mechanism, sensor-based user interface, controller) of the device 110, and a second portion 102b disposed in the accessory 190 and including a first diode or rectifier 192 connected in series with the battery 170 when the accessory 190 is connected with the device 110. A second, capacitor circuit element 104 disposed in the accessory 190 is connected in parallel with the battery circuit element 102 and includes a capacitor 193 connected in series with a second diode or rectifier 194. A third, photovoltaic cell circuit element 106 disposed in the accessory 190 is connected in parallel with the capacitor circuit element 104 and includes a photovoltaic cell 195 connected in series with a third diode or rectifier 196. The first diode 192 is configured to prevent current backflow from the capacitor 193 into the battery 170, to prevent the energy stored in the capacitor 193 from charging the battery 170. Using this arrangement, a non-rechargeable battery with a high energy density may be used in the device 110 (instead of a low energy density rechargeable battery) to reduce the size of the battery 170 while providing for a similar or greater battery life. The second diode 194 is configured to prevent current flow from the battery 170 to the capacitor 193, to prevent the battery from being used to charge the capacitor. The third diode 196 is configured to prevent current flow from the capacitor 193 to the photovoltaic cell 195 in the absence of light radiation on the photovoltaic cell (a condition often referred to as "dark current" losses).

The first and second diodes 192, 194 may be arranged such that when a voltage of the capacitor 193 exceeds a voltage of the battery 170, the capacitor supplies current to the device load 140 to power the load. When the voltage of the battery 170 exceeds the voltage of the capacitor 193, the battery supplies current to the load 140 to power the load. Other circuit arrangements may additionally or alternatively be utilized. For example, a DC-DC converter (not shown) could be included in series with the battery to provide a lower supply voltage from the battery to the load, and to permit a lower voltage output from the photovoltaic charged capacitor to power the load. In one such embodiment, the DC-DC converter may be operable to adjust an output voltage of the converter (e.g., as directed by the controller), to provide a first, lower voltage to operate the sensor and a second, greater voltage (e.g., in response to sensor detection of a user's hands) to operate the motor. In such an arrangement, the system may be configured such that the alternative power accessory only powers the user actuated sensor arrangement and controller, with the internal battery powering the motor.

As shown in FIG. 2, the first and second electrical connectors 111, 191 provide an electrical connection between first and second portions 102a, 102b of the battery circuit element 102 (at nodes 112, 114), and complete the parallel connection of the capacitor circuit element 104 with the battery circuit element 102 (at node 116).

Figure 3:
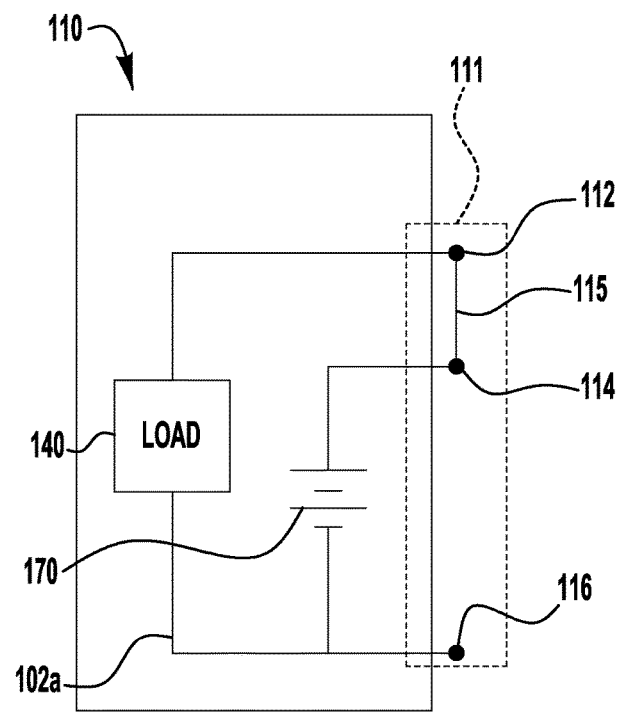
FIG. 3 is a schematic diagram of the battery powered device of FIG. 2, shown with the alternative power source accessory removed from the battery powered device.

According to another aspect of the present application, the first electrical connector 111 may be configured to form a completed or closed circuit from the first portion 102a of the battery circuit element 102 when the second electrical connector 191 is disconnected from the first electrical connector 111. While many different circuit closing arrangements may be utilized, in the illustrated embodiment, the first, female electrical connector 111 includes a normally closed switch contact 115 that is broken or opened when the second, male electrical connector 191 is connected with the female electrical connector 111. When the male electrical connector 191 is disconnected from the female electrical connector 111, as shown in FIG. 3, the switch contact 115 closes to close the first portion 102a of the battery circuit element, to provide current from the battery 170 to the load 140. One example of an electrical connection utilizing a switch contact is a phono connector or phono jack connection, as is used to provide an audio signal to connected headphones, and to provide the audio signal to alternate speakers when the headphone plug is disconnected from the phono jack.

Figure 4:
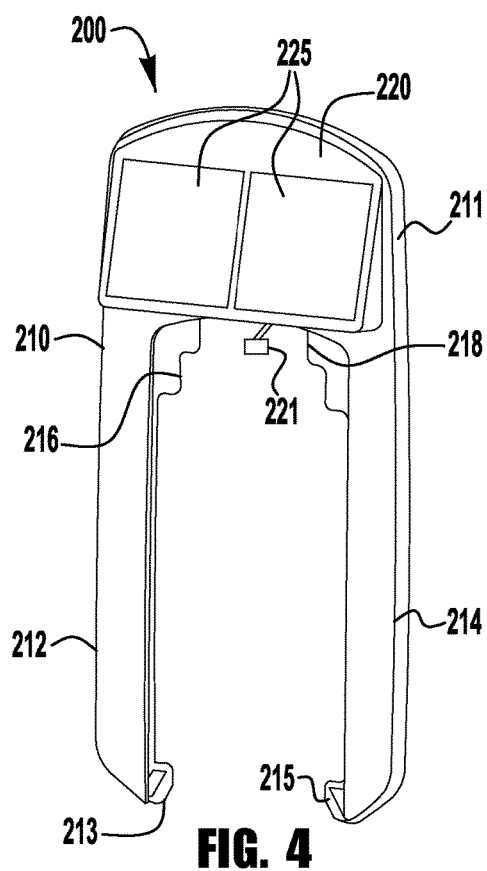
FIG. 4 is a front perspective view of a hands free fluid dispenser and an attachable photovoltaic cell accessory according to an exemplary embodiment, shown with the dispenser detached from the photovoltaic cell accessory.

Many different arrangements may be utilized to physically attach the photovoltaic cell (or other alternative power source) accessory to a dispenser (or other battery powered device). In one embodiment, as shown in FIG. 4, the photovoltaic cell accessory 200 includes a plate or panel 210 having laterally spaced side portions 212, 214 that extend on either side of a housing of a wall mounted fluid dispenser, and inward extending recessed flange portions 216, 218 that are disposed between the sides of the dispenser housing and an external wall surface when the rear surface of the dispenser housing is mounted to the external wall surface. Flexible tabs 213, 215 extend laterally inward from the side portions 212, 214 to snap into interlocking engagement with a rear portion of the dispenser. An example of this type of utility panel for a wall mounted dispenser is disclosed and described in greater detail in co-owned U.S. Pat. No. 8,590,751, the entire disclosure of which is incorporated herein by reference.

A photovoltaic cell module 220 is attached to an upper portion 211 of the panel 210 that extends above a top wall of the dispenser housing when assembled with the dispenser. The module 220 may include one or more photovoltaic cells 225, which may be disposed at an angle selected to increase direct exposure to incident light. The accessory 200 may be provided with a male electrical connector 221 that extends from the photovoltaic cell module 220 (e.g., from a bottom surface of the module) for connection with a female electric connector disposed on the dispenser housing (e.g., on the top wall of the dispenser housing).

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. In combination, a battery powered dispenser including a first electrical connector and an attachable photovoltaic cell accessory including a second electrical connector connectable with the first electrical connector;

the battery powered dispenser comprising:
　a housing;
　a reservoir carried by the housing for storing a fluid;
　a dispensing mechanism disposed in the housing and operable to dispense fluid from the reservoir; and
　a battery circuit element connected with the dispensing mechanism and partially defined by the first electrical connector, the battery circuit element including a non-rechargeable battery;

the photovoltaic cell accessory comprising:
　a mounting structure for attaching the photovoltaic cell accessory to the housing of the dispenser; and
　a photovoltaic cell module secured to the mounting structure and including a first module circuit element at least partially defined by the second electrical connector, a second module circuit element connected with the first module circuit element and including a capacitor, and a third module circuit element connected in parallel with the second module circuit element and including a photovoltaic cell that charges the capacitor;

wherein the first module circuit element includes a diode that is connected in series with the non-rechargeable battery when the second electrical connector is connected with the first electrical connector, to prevent current backflow from the capacitor into the non-rechargeable battery; and wherein the second module circuit element includes a diode connected in series with the capacitor to prevent current flow from the non-rechargeable battery to the capacitor when the second electrical connector is connected with the first electrical connector, wherein the diodes of the first and second module circuit elements are configured such that when the second electrical connector is connected with the first electrical connector and a voltage of the non-rechargeable battery exceeds a voltage of the capacitor, the non-rechargeable battery supplies current to the dispensing mechanism to power the dispensing mechanism, and when the voltage of the capacitor exceeds the voltage of the non-rechargeable battery, the capacitor supplies current to the dispensing mechanism to power the dispensing mechanism.

2. The combination of claim 1, wherein the first electrical connector comprises a female connector and the second electrical connector comprises a male connector.

3. The combination of claim 1, wherein the second module circuit element includes a diode connected in series with the capacitor to prevent current flow from the non-rechargeable battery to the capacitor when the second electrical connector is connected with the first electrical connector.

4. The combination of claim 1, wherein the third module circuit element includes a diode connected in series with the photovoltaic cell to prevent current flow from the capacitor to the photovoltaic cell.

5. The combination of claim 1, wherein the dispenser housing includes a wall mountable rear surface, and the mounting structure includes a panel configured to be at least partially disposed between the dispenser housing and an external wall surface when the rear surface of the dispenser housing is mounted to the external wall surface.

6. The combination of claim 1, wherein the first electrical connector is disposed on a top wall of the dispenser housing.

7. The combination of claim 1, wherein the dispensing mechanism comprises a pump disposed within the housing, a motor disposed within the housing and operable to actuate the pump to dispense fluid from the reservoir, and a user actuated sensor configured to initiate operation of the motor.

8. The combination of claim 7, wherein the battery circuit element includes a DC-DC converter connected in series with the battery to provide a lower supply voltage from the battery to the dispensing mechanism, and to permit a lower voltage output from the capacitor to power the dispensing mechanism.

9. The power management system of claim 8, wherein the DC-DC convertor is operable to have an adjustable output voltage to provide a first voltage to operate the sensor and a second voltage greater than the first voltage to operate the motor.

* * * * *